A. A. CHARBONNEAU.
CIGAR MOLD.
APPLICATION FILED MAR. 8, 1920.

1,393,087.  Patented Oct. 11, 1921.

Inventor
A. A. Charbonneau
By
Attorney

UNITED STATES PATENT OFFICE.

ARTHUR ALBERT CHARBONNEAU, OF MONTREAL, QUEBEC, CANADA.

CIGAR-MOLD.

1,393,087.     Specification of Letters Patent.     Patented Oct. 11, 1921.

Application filed March 8, 1920. Serial No. 364,016.

*To all whom it may concern:*

Be it known that I, ARTHUR ALBERT CHARBONNEAU, a British subject, cigar-maker, residing at No. 465 Beaudry street, in the city of Montreal, in the Province of Quebec, in the Dominion of Canada, have invented certain new and useful Improvements in Cigar-Molds; and I do hereby declare that the following is a full, clear, and exact description of the same.

The present invention relates to improvements in "cigar molds" and its principal object is to provide a mold particularly strong and cheap of construction.

Another object of the invention is to provide means to protect the sharp edge of one of the mold portions.

Another object of the invention is to provide means to protect the outer edges of the molds when cutting the ends or tips off the cigars.

Another important object of the present invention is to provide a mold that will be non-oxidizable and at the same time light and particularly strong.

To better understand the invention reference should be had to the accompanying drawings which form part of this application, and in which:—

Like numerals of reference indicate corresponding parts in each figure.

In the drawings:—

Figure 1:
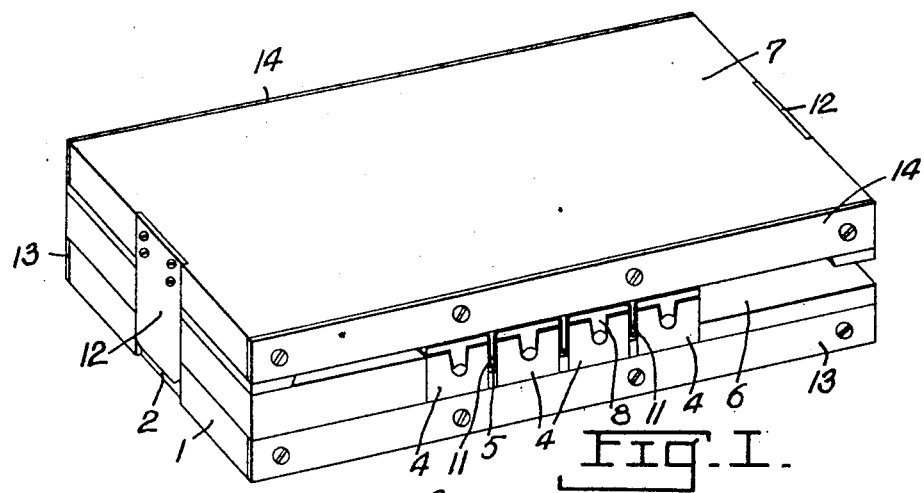
Figure 1 is a perspective view of the mold complete.

1 indicates one of the parts of the mold which is provided at each end with recesses 2, and 3 are a plurality of recesses of a semi-cigar shape provided in the metal blocks 4 which are preferably made of aluminum. The blocks 4 are suitably distanced apart from one another to provide a recess 5. One end of said mold portion 1 is preferably depressed at 6 to provide a space between that portion of the mold and the other portion, in which an instrument may be inserted to disengage or break apart the two mold portions.

7 is the other part of the mold which is provided with a plurality of oblong shape projecting members 8 adapted to fit snugly in the recesses 3, each of said projecting members 8 being provided with a semi-cigar shape recess 9 which terminates on each side of said member 8 in a very sharp edge 10. Each of said projecting members 8 is preferably made of aluminum and correspond in number to the number of blocks 4 provided on the other portion of the mold 1.

Between each projecting members 8 is provided a protecting member 11 which runs parallelly to the projecting members 8 and is preferably higher than the sharp edge 10, in order to protect said sharp edge from injury as well as serve as guides when the mold portion 7 is fitted over the mold portion 1. Said protecting members 11 are preferably provided between each of the projecting members 8 and are adapted to engage into the recesses 5 provided in between the blocks 4 in the mold portion 1. The said protecting members 11 are illustrated as being of a T-shape and engage and are secured under the projecting members 8.

At each end of said mold portion 7 is provided a guide member 12 which is adapted to engage the recess 2 when the two portions of the mold are closed together.

Applicant is aware of the existence of wooden molds for cigars which have somewhat the shape of the mold referred to in this application. But a wooden mold is rather expensive to make as it is very delicate work to make the projecting member 8 with the recess 9 and the sharp edges 10. The sharp edges, when the mold is made of wood, are destroyed very easily and it is for this purpose, *i. e.* to protect the edges 10 that the protecting members 11 have been provided, as they project a little higher than the edges 10 and if the mold is dropped or hits anything the edges will be protected from damage.

Another important feature of the present invention resides in the fact of making a mold of aluminum or any light metal which is not oxidizable, so that it can be easily washed or cleaned after usage. Wooden molds have the defect of absorbing nicotin or at least the juice which comes from the pressed tobacco leaves and after a certain time the mold becomes useless as it usually gives a taste to the tobacco. A wooden mold also cannot be washed or disinfected very easily and for that purpose is objectionable. It has been found so far, by applicant, that the use of aluminum in making a mold of this character, was best, and permitted the disinfecting of the mold without injury to the mold. Further the nicotin or juice from the leaves of the tobacco will not be absorbed by metal and it was found that aluminum was the only metal that did not give a taste to the tobacco.

Figure 2:
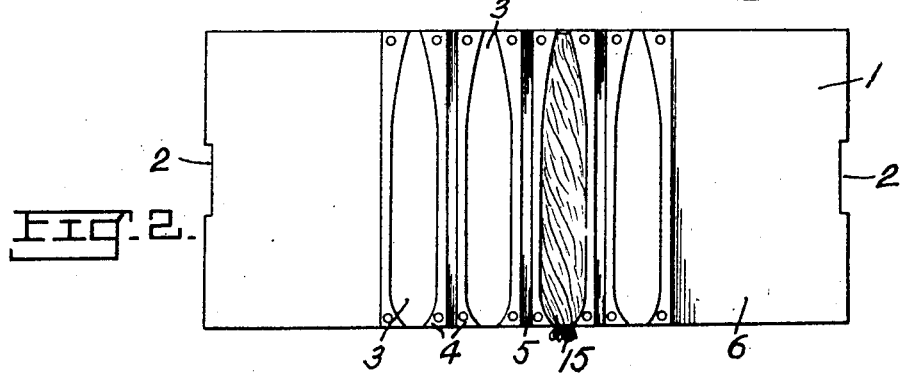
Fig. 2 is a plan view of one of the parts of the mold in which a cigar is shown in one of the recesses.
Figure 3:
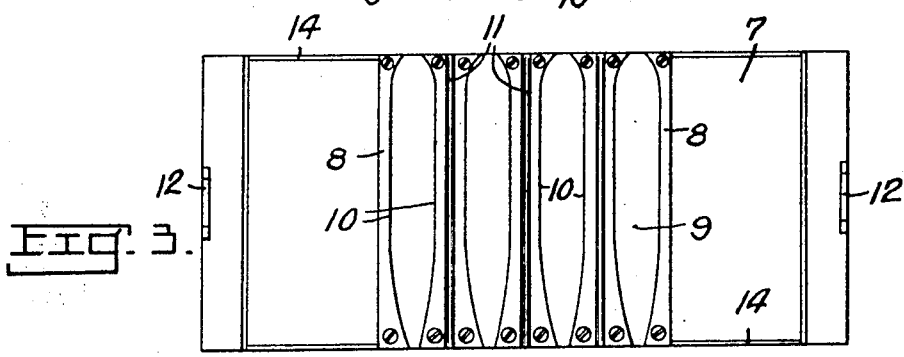
Fig. 3 is a plan view of the other part of the mold.
Figure 4:
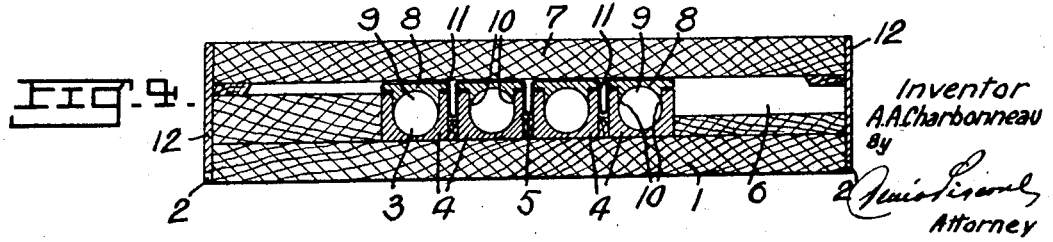
Fig. 4 is a longitudinal sectional view through the mold complete.

Another very important feature of the present invention is the side metal plates 13 and 14 which are provided on one or both sides of the molds in order to protect the mold from being chopped or used up by the cigar-maker when he chops the ends 15 as disclosed in Fig. 2 off a cigar after it is pressed.

What I claim as my invention is:

1. A mold of the character described comprising two half portions; a plurality of recesses provided in one portion of said mold; a plurality of suitably shaped projecting members provided on the other portion of said mold and adapted to fit in said recesses in the aforesaid portion of said mold, said projecting portion having sharp edges; and a plurality of protecting members provided adjacent said projecting members substantially as described.

2. A mold of the character described comprising two half portions, one of said portions being provided with a plurality of suitably shaped recesses; a plurality of grooves adjacent said recesses; a plurality of projecting members provided on the other half portion of said mold, said projecting members having sharp edges; a plurality of protecting members provided adjacent said projecting members and adapted to engage said grooves in the aforesaid half portion of the mold substantially as described.

3. A mold of the character described comprising two half portions, one of said portions being provided with a plurality of blocks having intermediate thereof suitably shaped recesses; a groove provided adjacent each of said blocks; a plurality of projecting members provided on the other half portion of said mold, said projecting members having a plurality of suitably shaped recesses provided with sharp edges, said projecting members being adapted to fit snugly in the suitably shaped recesses provided in the blocks on said other half portion of the mold; and a protecting member provided between each of said projecting members and adapted to engage in the groove in the aforesaid half portion of said mold, substantially as described.

4. A mold of the character described comprising two half portions, one of said portions being provided with a recess at each end; a plurality of blocks secured in said half portion of the mold, each of said blocks being provided with a suitably shaped recess; a plurality of grooves provided between each of said blocks; a plurality of projecting members provided with a suitably shaped recess having sharp edges suitably secured to said other half portion of said mold; means to protect said sharp edges on said projecting members, said means being adapted to engage the groove in the aforesaid half portion of the mold; and a guide member projecting from each end of said half portion of the mold and adapted to engage the recess in the aforesaid portion of said mold, substantially as described.

5. A mold of the character described comprising two half portions, one of said portions being provided with a plurality of independent and integral metal blocks, each provided with a recess; a space provided between each of said blocks; a plurality of projecting metal members, each provided with a suitably shaped recess having sharp edges, said members being suitably secured to the other half portion of said mold; and means to protect said sharp edges on said projecting members, said means being adapted to engage the space provided between the metal blocks on the other half portion of the mold, substantially as described.

Signed at Montreal, Quebec, Canada, this 14th day of February, 1920.

ARTHUR ALBERT CHARBONNEAU.

Witnesses:
C. PATENAUDE,
F. K. GILMOUR.